A. J. WEISS.
DEVICE FOR REGULATING SUPPLEMENTAL SUPPLY OF FUEL MIXTURES AND AIR TO INTERNAL COMBUSTION ENGINES.
APPLICATION FILED MAR. 11, 1914.
1,115,632.
Patented Nov. 3, 1914.
2 SHEETS—SHEET 1.
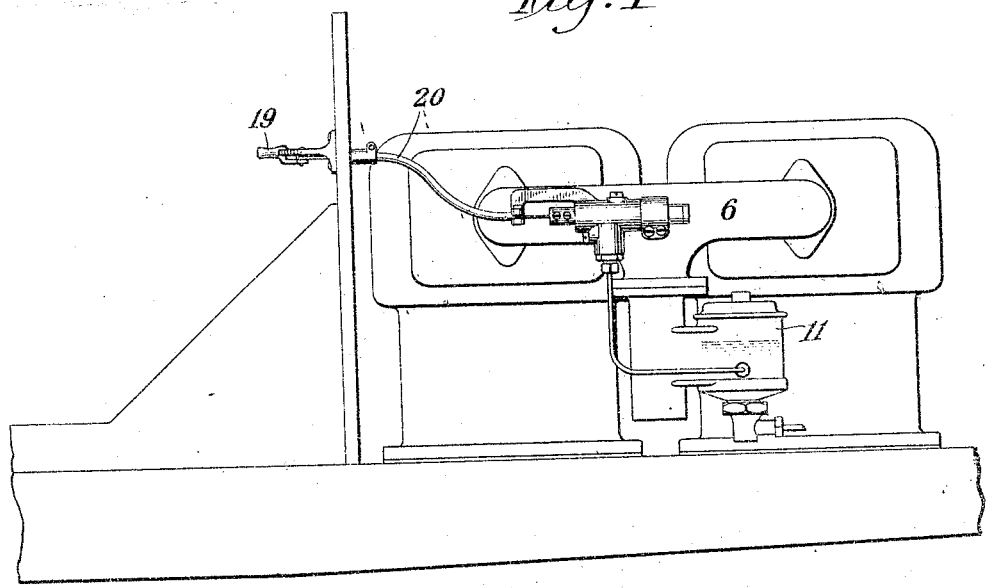
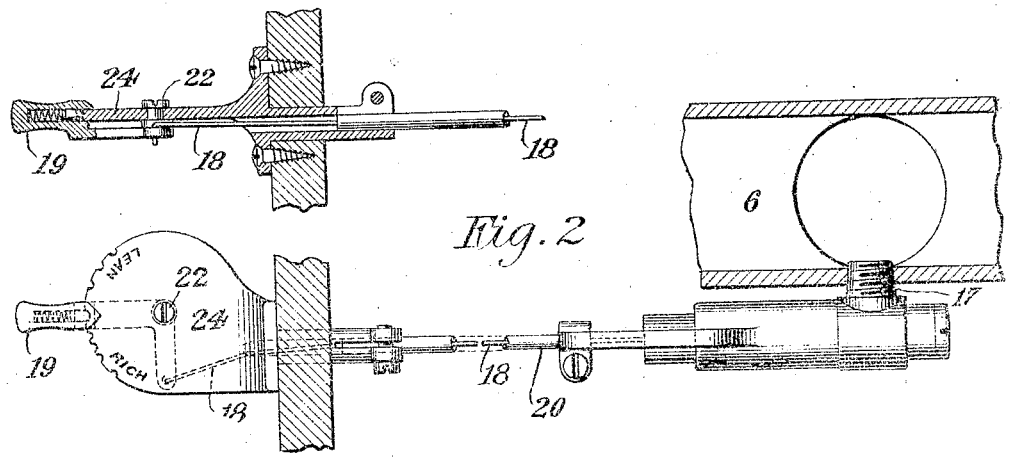

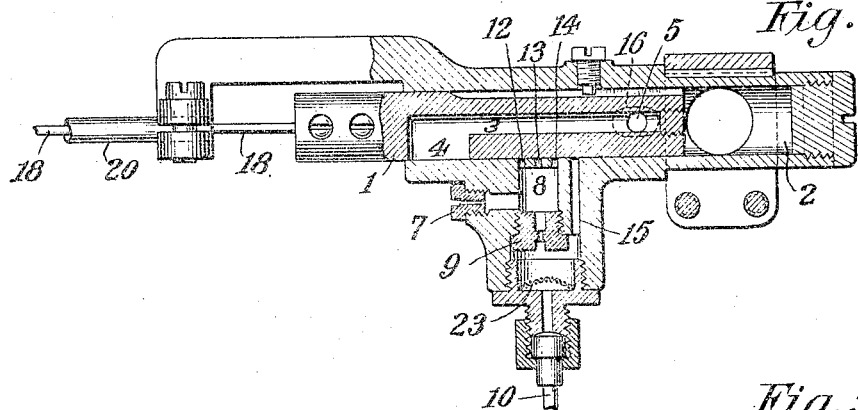
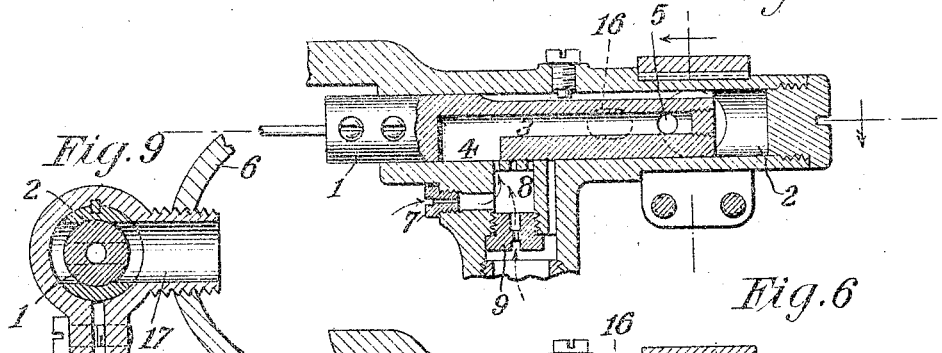
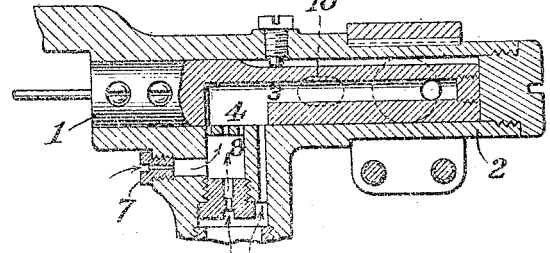
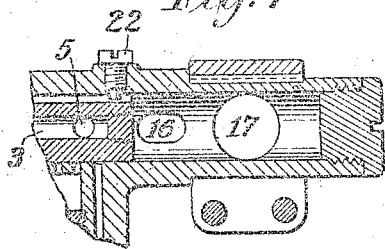
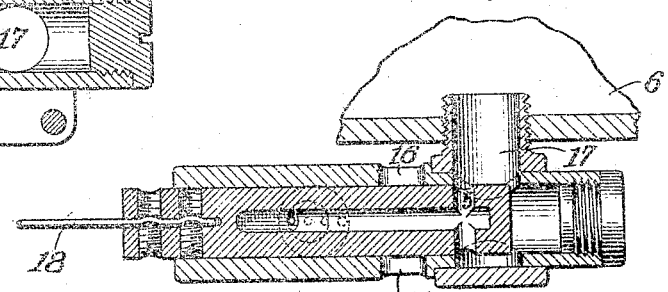

UNITED STATES PATENT OFFICE.

ARTHUR J. WEISS, OF WEST ORANGE, NEW JERSEY, ASSIGNOR OF ONE-HALF TO EDWARD A. McCOY, OF EAST ORANGE, NEW JERSEY.

DEVICE FOR REGULATING SUPPLEMENTAL SUPPLY OF FUEL MIXTURES AND AIR TO INTERNAL-COMBUSTION ENGINES.

1,115,632. Specification of Letters Patent. Patented Nov. 3, 1914.

Application filed March 11, 1914. Serial No. 823,946.

*To all whom it may concern:*

Be it known that I, ARTHUR J. WEISS, a citizen of the United States, residing at the town of West Orange, in the county of Essex, State of New Jersey, have invented a new and useful Device for Regulating Supplemental Supply of Fuel Mixtures and Air to Internal-Combustion Engines, of which the following is a specification, reference being had to the accompanying drawings, which form a part of the same.

This device has for its object the ready supplying of fuel to internal combustion engines to facilitate the starting of the same, and is particularly desirable in connection with automobile motors as the operation of the device may be controlled from the dash. Fuel passing through this device may be proportioned according to the needs of the motor or taste of the operator; and the supply of fuel may also be entirely shut off and air only supplied through this device, which is desirable when the motor is hot and a lean fuel mixture is all that is desired, the air admitted through this device, which I will refer to hereafter as a regulator, supplementing the supply of air admitted through the carbureter. A carbureter to give its greatest efficiency, must be adjusted for regular running. If the carbureter is adjusted for starting alone, it will furnish too rich a fuel mixture when the motor is warmed up. If the carbureter is adjusted for high speed, it is difficult to start the engine with such adjustment. Where my regulator device is used, it is preferred to adjust the carbureter for average running of the engine.

My device also has for its object the admission of more air to the motor, thus thinning the fuel mixture, which is very desirable when the engine is running at high speed, thus cutting down the quantity of fuel to maintain the running of the engine, without cutting down the speed.

Referring to the drawings, Figure 1 is a side view of my device which is shown as attached to the intake manifold of an automobile motor. Fig. 2 is another view of my device attached to the intake manifold of an automobile motor, looking at the device from the top, the intake manifold and the dash being shown in cross section. Fig. 3 shows the method of attaching the controlling lever and its connecting link to the dash of an automobile. Fig. 4 is a side elevation view of my device partly shown in cross section, the device being shown in neutral position. Fig. 5 is a side elevation shown in cross section arranged so as to show the admission of the smallest quantity of fuel mixture through this device into the cylinder of the engine. Fig. 6 is another elevation shown in cross section showing the device in such position as to admit a maximum amount of fuel mixture into the cylinders of the engine. Fig. 7 is a partial elevation of my device shown in cross section with the plunger withdrawn so as to shut off all fuel supply and admit only air to the motor. Fig. 8 is a plan view of my device showing the plunger in such a position as to bring the fuel supply ports into register with the conduit connecting with the intake manifold; and Fig. 9 is a cross section of my regulator and of a portion of the intake manifold to which it is attached.

Referring in detail to the drawings, 1 is a plunger or piston adapted to slide in the cylinder 2. The said piston is provided with tubular channels 3, having the openings 4 and 5 respectively near the opposite ends thereof. When in neutral position the openings 4 and 5 are entirely closed so as to admit no fuel mixture or air into the intake manifold 6, to which the said regulator is attached in any convenient manner. In Fig. 4 of the drawings the device is shown in neutral position.

Referring to Fig. 5 the piston or plunger 1 is shown in the position whereby the leanest combination of fuel mixture may be supplied through this device. The air is supplied through the bushing 7 into the mixing chamber 8, and the liquid fuel supply is drawn through the bushing 9 which connects with the pipe or conduit 10, which in turn connects with the fuel supply 11, which in the drawings is shown to be the fuel chamber of the carbureter. Of course the fuel supply may be obtained from any other convenient part of the motor, as for instance the fuel tank, usually carried under the seat or in the cowl of an automobile.

In Fig. 6 the plunger 1 is shown in such a position as to admit the richest mixture of fuel to the cylinders, the air being supplied through the bushing 7 at atmospheric pressure while the raw fuel is drawn through the bushing 9 into the chamber 8 and mixed with the air admitted through the bushing 7, the mixture being drawn up through the ports 12, 13 and 14. In addition to this, raw fuel is drawn through the duct 15, the whole mass being drawn through the tubular chamber of the plunger into the intake manifold and from thence into the cylinders of the motor in the usual manner.

When the plunger 1 is drawn back to its full extent in the regulator cylinder the air ports 16 are opened, permitting air to be drawn into and through the pipe or conduit 17 connecting the regulator with the manifold.

The piston or plunger 1 is connected in a suitable manner such as by the rod 18 to the manually operated lever 19, a sleeve 20 being provided to protect said rod. A plate 24 is provided for use in conjunction with said lever, indicating the direction in which to move the same in order to provide a rich mixture or a lean mixture of fuel as may be desired, the lever being shown in a neutral position.

The device may be attached in any convenient manner to an internal combustion engine, the regulator control lever being placed in a convenient position such as on the dash or steering post of an automobile.

In order to start a motor equipped with this regulator device, the spark plugs are switched on to the battery or magneto in the usual way and the lever is moved all the way over to the position indicated by the word "rich" in Fig. 2. This movement of the lever acting on the angle 21 which is pivoted at 22 and which in turn acts upon the rod 18, which connects with the piston 1, slides the said piston in the regulator cylinder 2 until the opening 4 is in register with the ports 12, 13 and 14 and the duct 15, and the opening 5 of the piston is in register with the pipe or conduit 17 connecting the regulator device with the manifold 6 of the engine. This position of the piston having been obtained through the movement of the lever to the position indicated by the word "rich," the engine is turned over in any well-known manner as by a crank, the effect of which is to draw the fluid fuel from the fuel chamber 11 through the pipe or conduit 10, the screen 23 up through the bushing 9 into the mixing chamber 8 where it comes in contact with the air admitted at atmospheric pressure through the bushing 7, the source of air always being maintained at the same pressure and quantity, and the mixture is then drawn through ports 12, 13 and 14 and the liquid fuel unadulterated with air being drawn through the duct 15, and the mass being then drawn by vacuum through the opening 4, channel 3 and opening 5 into the manifold 17, and from thence into the cylinders in any well-known manner.

This operation brings the fuel mixture into contact with the energized spark plugs in the usual way and the engine begins to run. In practice it has been found that even when the atmospheric conditions are below zero, in practically every case the motor will start running upon a quarter turn where the ignition device is in working order.

Having described this invention in connection with a number of illustrative embodiments, forms, proportions, materials and arrangement of parts, and steps, to the details of which disclosure the invention is not of course to be limited, what is claimed as new and what is desired to be secured by Letters Patent is set forth in the appended claims.

1. In a priming and regulating device for internal combustion engines, a piston having a channel therein with inlet and outlet openings near the opposite ends thereof, a cylinder in which said piston is adapted to operate, means for operating said piston, a mixing chamber with air and fuel ports communicating therewith, a plurality of ports extending from said mixing chamber and being adapted to register successively with the inlet opening in the piston, a supplemental channel extending from said cylinder and adapted to register with the inlet opening of the channel of said piston, said supplemental channel communicating with the liquid fuel supply and adapted to feed raw fuel through the channel of said piston and the outlet opening thereof, an opening connecting said regulator device with the intake manifold of the engine, and means for operating said piston so as to bring the outlet opening of the piston channel into and out of register with the fuel ports and into and out of register with the outlet opening of the piston communicating with the intake manifold, and also into and out of register with the air intake when the fuel feed is closed so as to admit only air through said device into the engine.

2. In a priming and regulating device for internal combustion engines, a piston having a channel therein, inlet and outlet openings in said channel, a cylinder in which said piston is adapted to operate, a manually operated lever, link connection between said lever and said piston, the operation of said lever subjecting said piston to a reciprocal movement, fuel feed connection adapted to register with the intake opening of said piston, and means for drawing fuel through the piston into the engine cylinders.

3. In a priming and regulating device for internal combustion engines, a mixing chamber, air and fuel ports leading thereinto, a plurality of outlet ports therein, means for opening and closing one or more of said outlet ports, and means for drawing gas through said outlet ports when in open position into the engine cylinders.

4. In a priming and regulating device for internal combustion engines, a mixing chamber, means for the feeding of air and fuel thereto, a tube communicating between the raw fuel supply and the cylinder, and means for drawing fuel mixture from the mixing chamber and raw fuel from the said tube into the engine cylinders.

ARTHUR J. WEISS.

Witnesses:
JESSIE B. KAY,
JAMES N. CATLOV.